(12) United States Patent
Tamai

(10) Patent No.: US 7,415,600 B2
(45) Date of Patent: Aug. 19, 2008

(54) MICROPROCESSOR THAT CARRIES OUT CONTEXT SWITCHING BY SHIFTING CONTEXT INFORMATION STORED IN A RINGED SHIFT REGISTER

(75) Inventor: Takanori Tamai, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 316 days.

(21) Appl. No.: 11/055,980

(22) Filed: Feb. 14, 2005

(65) Prior Publication Data

US 2005/0216709 A1    Sep. 29, 2005

(30) Foreign Application Priority Data

Mar. 29, 2004  (JP) .............................. 2004-096627

(51) Int. Cl.
*G06F 5/08* (2006.01)
(52) U.S. Cl. ..................................... 712/228
(58) Field of Classification Search ................. 712/228
See application file for complete search history.

(56) References Cited

U.S. PATENT DOCUMENTS

| 6,128,728 A * | 10/2000 | Dowling | 712/228 |
| 2003/0025716 A1 * | 2/2003 | Colavin | 345/684 |
| 2003/0039400 A1 * | 2/2003 | Launiainen | 382/240 |

FOREIGN PATENT DOCUMENTS

| JP | 3-268141 | 11/1991 |
| JP | 3-280132 | 12/1991 |
| JP | 5-181817 | 7/1993 |
| JP | 8-55028 | 2/1996 |

OTHER PUBLICATIONS

Tanenbaum, Andrew S. Structured Computer Organization. 2nd Ed. Prentice: 1984. p. 11.*
Yasuo Hidaka, et al., "Multiple Threads in Cyclic Register Windows", International Conference on Computer Architecture, Proceedings of the 20th Annual International Symposium on Computer Architecture, pp. 131-142, 1993. ISSN: 0163-5964.
Nobuyuki Yamasaki, et al., "Design and Implementation of Function-Classified Parallel Computer Architecture for Personal Robots ASPIRE using RISC Processors", *Journal of the Robotics Society of Japan*, vol. 14, No. 4, May 15, 1996, pp. 123-131.

* cited by examiner

*Primary Examiner*—Eddie P Chan
*Assistant Examiner*—Robert E Fennema
(74) *Attorney, Agent, or Firm*—Oblon, Spivak, McClelland, Maier & Neustadt, P.C.

(57) ABSTRACT

A microprocessor includes a first ringed shift register having a plurality of registers storing a plurality of context information respectively, the registers being connected in a loop, an instruction decoder transmitting the context information to a reference register in the first ringed shift register, an instruction execution unit exchanging the context information with the reference register, and a control unit controlling the first ringed shift register to perform a shift operation to carry out context switching.

12 Claims, 10 Drawing Sheets

MICROPROCESSOR THAT CARRIES OUT CONTEXT SWITCHING BY SHIFTING CONTEXT INFORMATION STORED IN A RINGED SHIFT REGISTER

CROSS REFERENCE TO RELATED APPLICATIONS

This application is based upon and claims the benefit of priority from prior Japanese Patent Application P2004-096627 filed on Mar. 29, 2004; the entire contents of which are incorporated by reference herein.

BACKGROUND OF THE INVENTION

1. Field of the Invention

The present invention relates to microprocessors that execute context switching, particularly to microprocessors that have a plurality of sets of context information.

2. Description of the Related Art

Microprocessors that carry out multitask processing to execute plural programs in parallel are well known. Program execution in multitask processing by such microprocessors is suspended by an external interrupt or the like. Generally, when program execution is suspended, a microprocessor stores information (hereafter, referred to as 'context information') that indicates previous execution status of the suspended program and the microprocessor's status in a memory unit.

When a suspended program is resumed, a microprocessor is restored to the status before suspension by reading the context information stored in the memory unit. Storing execution statuses of multiple programs in the memory unit as context information respectively, and changing the context information to be used by a microprocessor for multitask processing is referred to as 'context switching'.

There is a method for a microprocessor to store a plurality of sets of context information using a register bank architecture or a register window architecture. However, according to the above method, context switching is carried out by address conversion. In other words, in a microprocessor, an instruction execution unit and an instruction decoder, which execute programs, and a plurality of registers in which context information is stored are connected via selectors or the like. The microprocessor then specifies the address of a register in which necessary context information is stored, and reads that context information. Therefore, there are numerous interconnects and selectors among the instruction execution unit, the instruction decoder, and the registers in which context information is stored. As a result, the circuit size and power consumption of the microprocessor increase. In addition, numerous connected circuits cause increases in load when writing data to the registers from the instruction execution unit and the instruction decoder.

SUMMARY OF THE INVENTION

An aspect of the present invention inheres in a microprocessor including a first ringed shift register having a plurality of registers configured to store a plurality of context information respectively, the registers being connected in a loop; an instruction decoder configured to transmit the context information to a reference register in the first ringed shift register; an instruction execution unit configured to exchange the context information with the reference register; and a control unit configured to control the first ringed shift register to perform a shift operation to carry out context switching.

DETAILED DESCRIPTION OF THE INVENTION

Figure 1:
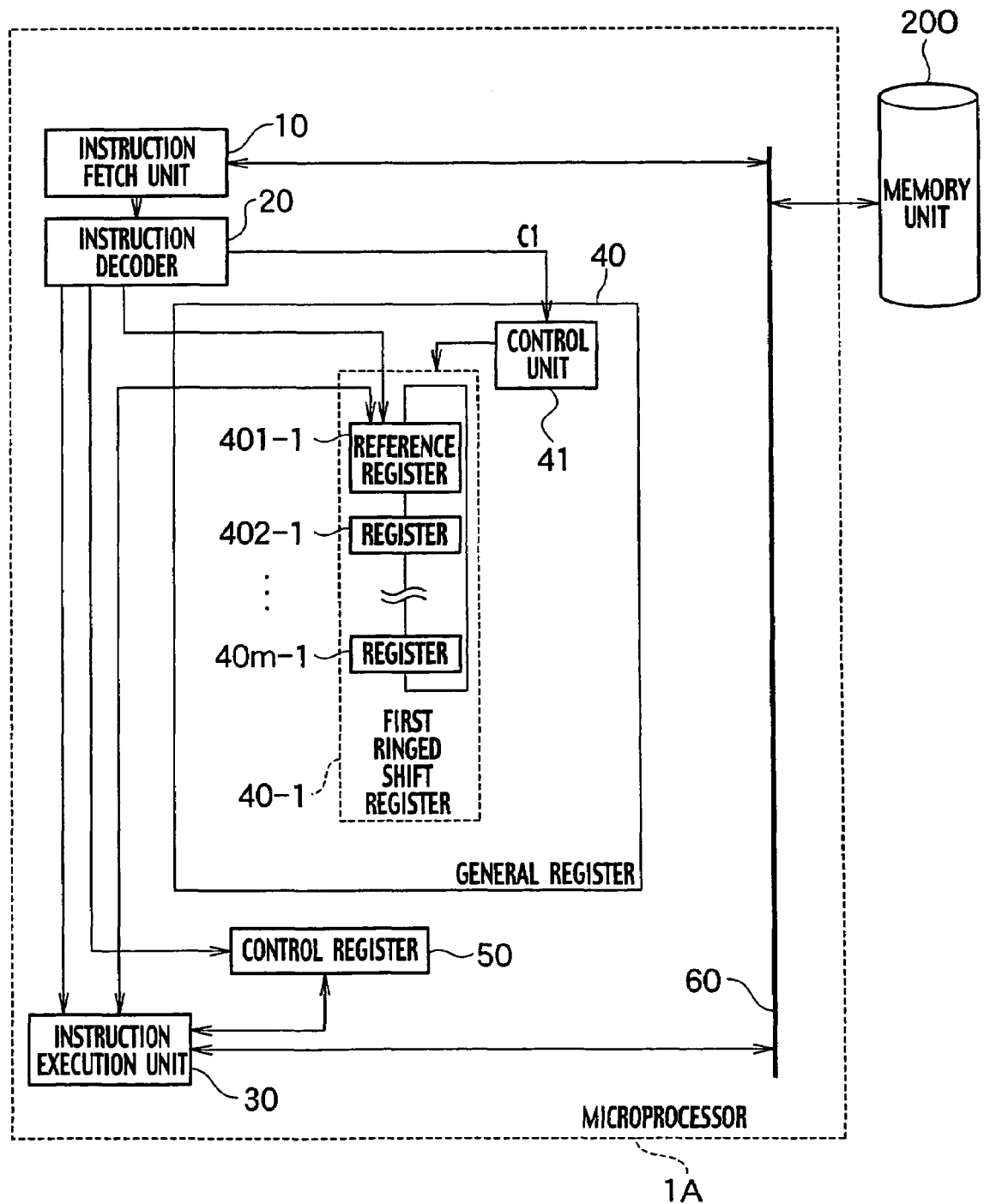
FIG. 1 is a view showing a schematic circuit configuration of a microprocessor according to a first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following descriptions, numerous specific details are set fourth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

First Embodiment

As shown in FIG. 1, a microprocessor according to a first embodiment of the present invention is a microprocessor 1A encompassing a general register 40, which includes a first ringed shift register 40-1 having a reference register 401-1 and a plurality of registers 402-1, ..., and 40$m$-1 which store context information respectively, and which are connected in a loop, an instruction decoder 20, which transmits context information to the reference register 401-1 in the first ringed shift register 40-1, and an instruction execution unit 30, which exchanges context information with the reference register 401-1; where m denotes an integer of 2 or greater.

A group of registers connected in a loop is referred to as a 'ringed shift register'. A 32-bit register, for example, is available for the reference register 401-1 and the registers 402-1, ..., and 40$m$-1 in the first ringed shift register 40-1.

In addition, the microprocessor 1A encompasses an instruction fetch unit 10, a control register 50, and an internal bus 60. Furthermore, the general register 40 includes a control unit 41.

The instruction fetch unit 10 is connected to the instruction decoder 20. The instruction decoder 20 is connected to the instruction execution unit 30, the first ringed shift register 40-1, the control unit 41, and the control register 50. In addition, the instruction execution unit 30 is connected to the first ringed shift register 40-1 and the control register 50. Furthermore, the instruction fetch unit 10 and the instruction execution unit 30 are connected to the internal bus 60.

In addition, as shown in FIG. 1, the internal bus 60 can be connected to a memory unit 200. The memory unit 200 is random access memory (RAM) or the like, which is arranged in the same chip or the microprocessor 1A, for example.

The general register 40 stores a plurality of sets of context information and data such as in-progress results from executing a program. For example, when the first ringed shift register 40-1 includes the reference register 401-1 and the registers 402-1, . . . , and 40m-1, m sets of context information can be stored in the general register 40. In addition, the control unit 41 is connected to the first ringed shift register 40-1, and controls the first ringed shift register 40-1 to perform a shift operation according to an instruction from the instruction decoder 20.

Excessive context information and programs that cannot be stored in the general register 40 are stored in the control register 50. In addition, the instruction fetch unit 10 and the instruction execution unit 30 read/write data from/in the memory unit 200 via the internal bus 60.

The instruction fetch unit 10 provides fetched instruction codes to the instruction decoder 20 so as to execute a program. The instruction decoder 20 then transmits a control signal to the instruction execution unit 30, the general register 40, and the control register 50. In addition, the general register 40 and the control register 50 transmit to the instruction execution unit 30 a request signal, which requests to write the execution results. The instruction execution unit 30 writes the program execution results in the general register 40 and the control register 50.

When the microprocessor 1A carries out context switching according to an interrupt operation or instructions of a running program, to begin with, context information of the running program is stored in the reference register 401-1. Next, the instruction decoder 20 transmits a control signal C1 to the control unit 41. The control unit 41 then controls the first ringed shift register 40-1 to perform a shift operation. Specifically, the first ringed shift register 40-1 shifts data stored in the reference register 401-1, for example, to the register 402-1, which is connected to the reference register 401-1, and data stored in the register 40m-1 to the reference register 401-1 at the same time. The first ringed shift register 40-1 continues to perform a shift operation until the context information used for the microprocessor 1A to execute a program is stored in the reference register 401-1. Subsequently, the microprocessor 1A executes a program using the context information stored in the reference register 401-1.

In the above description, the case of data stored in the reference register 401-1 being shifted to the register 402-1 has been described; alternatively, the first ringed shift register 40-1 may shift data stored in the reference register 401-1 to the register 40m-1. In other words, the shifting direction for the first ringed shift register 40-1 may be determined considering the necessary number of times of shifting until context information, which is used for the microprocessor 1A to execute a program, is stored in the reference register 401-1. The shifting direction for the first ringed shift register 40-1 may be specified by the instruction decoder 20.

As described above, in the microprocessor 1A shown in FIG. 1, the first ringed shift register 40-1 shifts and stores data, which is stored in the registers 402-1, . . . , and 40m-1, in the reference register 401-1. The context information is then exchanged among the reference register 401-1, the instruction decoder 20, and the instruction execution unit 30. The registers 402-1, . . . , and 40m-1 are not connected to the instruction decoder 20 and the instruction execution unit 30. The number of interconnects or selectors for selecting a single register from among the reference register 401-1 and the registers 402-1, . . . , and 40m-1, which are included in the first ringed shift register 40-1, can be reduced. In addition, fewer circuits connected to the instruction decoder 20 and the instruction execution unit 30 allow reduction in load when the instruction decoder 20 and the instruction execution unit 30 write data in the general register 40. Accordingly, the microprocessor 1A shown in FIG. 1 allows reduction in circuit size and power consumption.

<First Modification of the First Embodiment>

Figure 2:
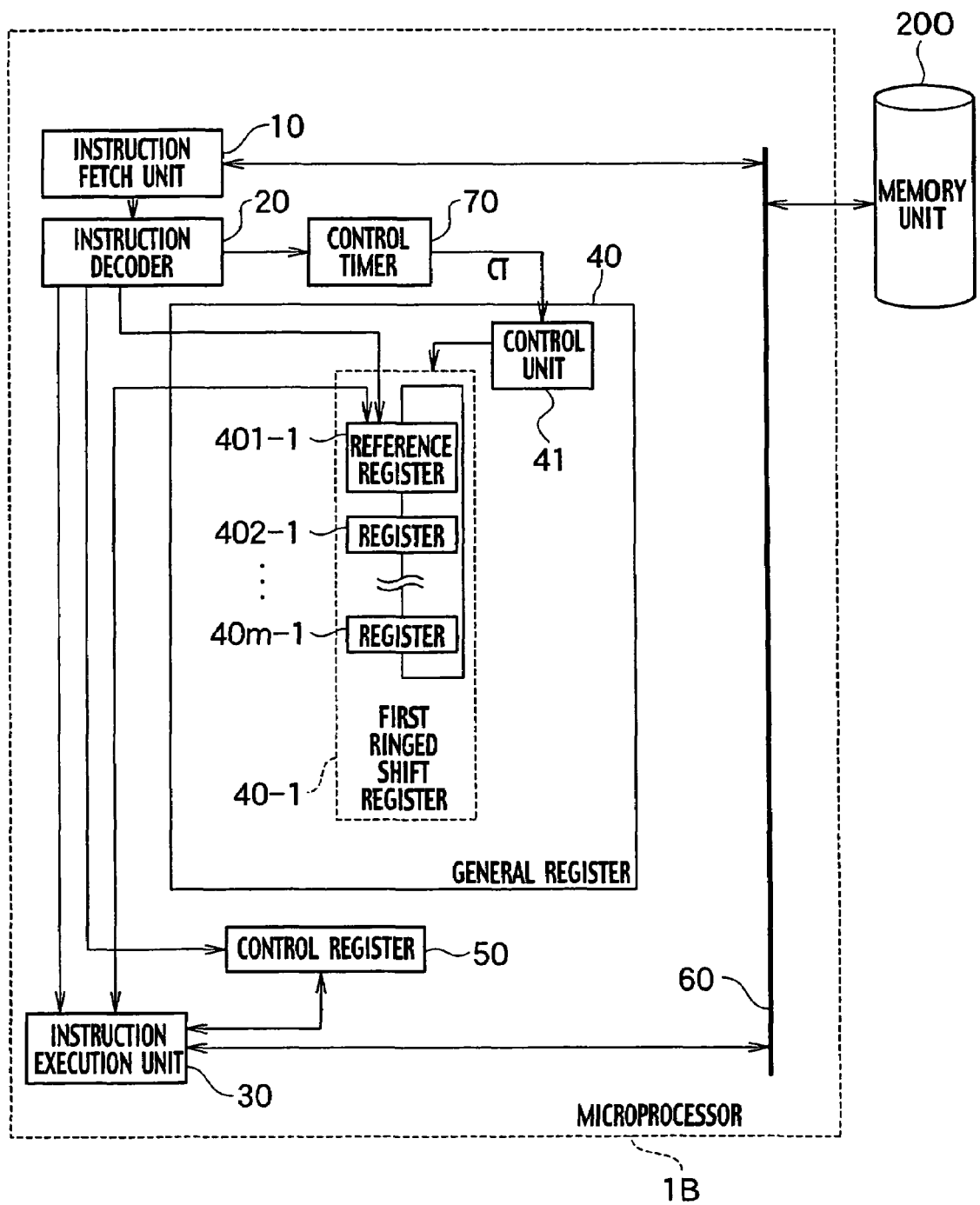
FIG. 2 is a view showing a schematic circuit configuration of a microprocessor according to a first modification of the first embodiment of the present invention.

A microprocessor 1B, according to a first modification of the first embodiment of the present invention shown in FIG. 2, is different from the microprocessor 1A shown in FIG. 1 in that a control timer 70 is additionally encompassed. The control timer 70 is connected to the instruction decoder 20 and the control unit 41 in the general register 40. Other configurations are the same as those of the microprocessor 1A shown in FIG. 1.

In the microprocessor 1B shown in FIG. 2, the control unit 41 receives a control signal CT from the control timer 70. The first ringed shift register 40-1 then performs a shift operation under the control of the control unit 41, and the microprocessor 1B carries out context switching. In other words, the control timer 70 controls the times when the microprocessor 1B carries out context switching, and the switching of programs can be executed according to the predetermined time. In addition, the control of context switching by the control timer 70 may be disabled according to a signal from the instruction decoder 20.

<Second Modification of the First Embodiment>

Figure 3:
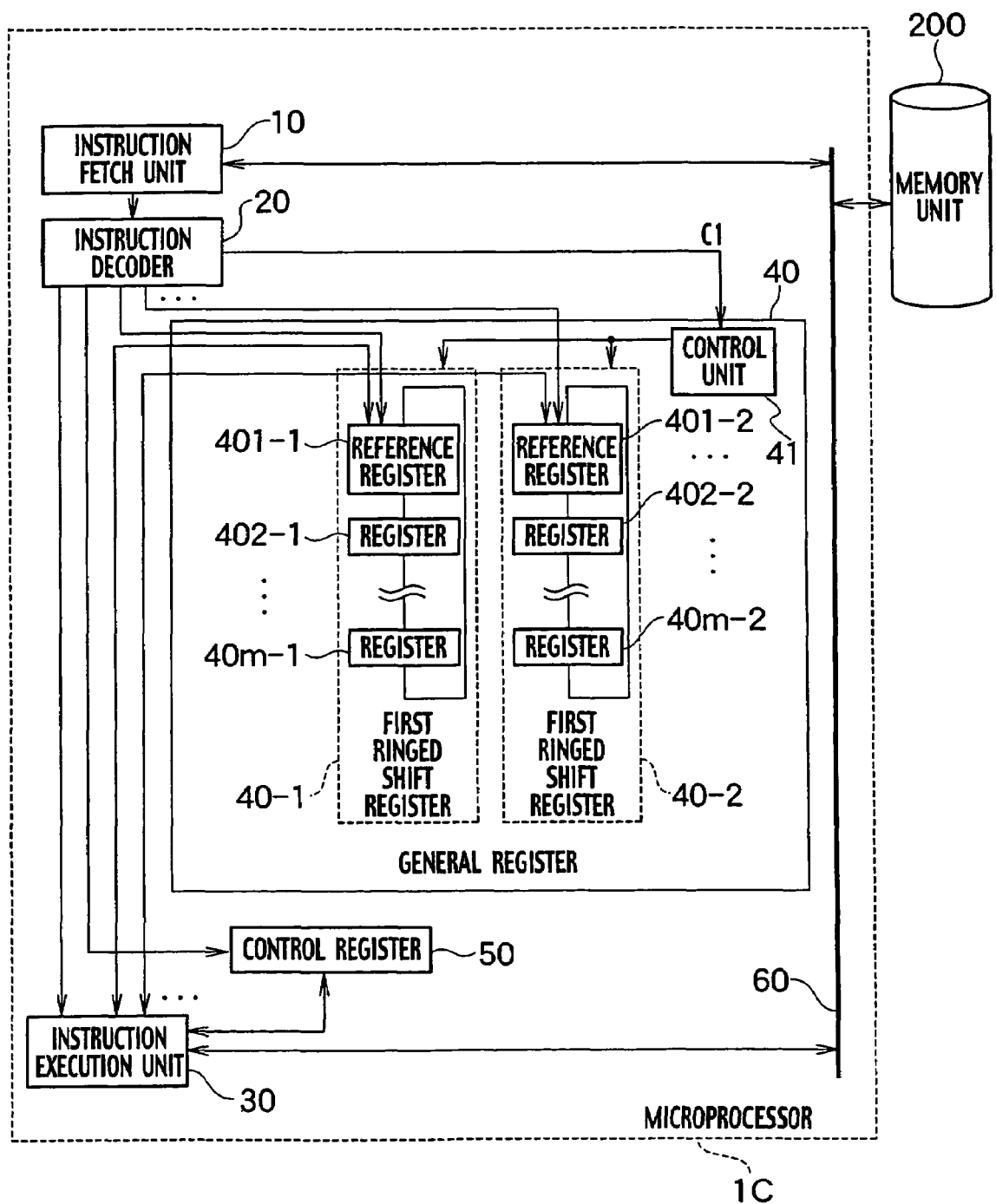
FIG. 3 is a view showing a schematic circuit configuration of a microprocessor according to a second modification of the first embodiment of the present invention.

A microprocessor 1C, according to a second modification of the first embodiment of the present invention shown in FIG. 3, is different from the microprocessor 1A shown in FIG. 1 in that the general register 40 further encompasses first ringed shift registers 40-2, . . . . Other configurations are the same as those of the microprocessor 1A shown in FIG. 1.

The reference registers 401-1, 401-2, . . . each being an element of the registers in each first ringed shift register 40-1, 40-2, . . . are connected to the instruction decoder 20 and the instruction execution unit 30. Context information of a program to be executed by the microprocessor 1C is read/written using the reference registers 401-1, 401-2, . . . The selectors or the like which select one of the registers in each first ringed shift register 40-1, 40-2, . . . becomes unnecessary, and circuit size is decreased.

In addition, the first ringed shift registers 40-1, 40-2, . . . are controlled individually by the control unit 41. In other words, the control unit 41 may control one of the first ringed shift registers 40-1, 40-2, . . . to perform a shift operation, and control plural first ringed shift registers to simultaneously perform a shift operation according to the control signal C1 from the instruction decoder 20.

Second Embodiment

Figure 4:
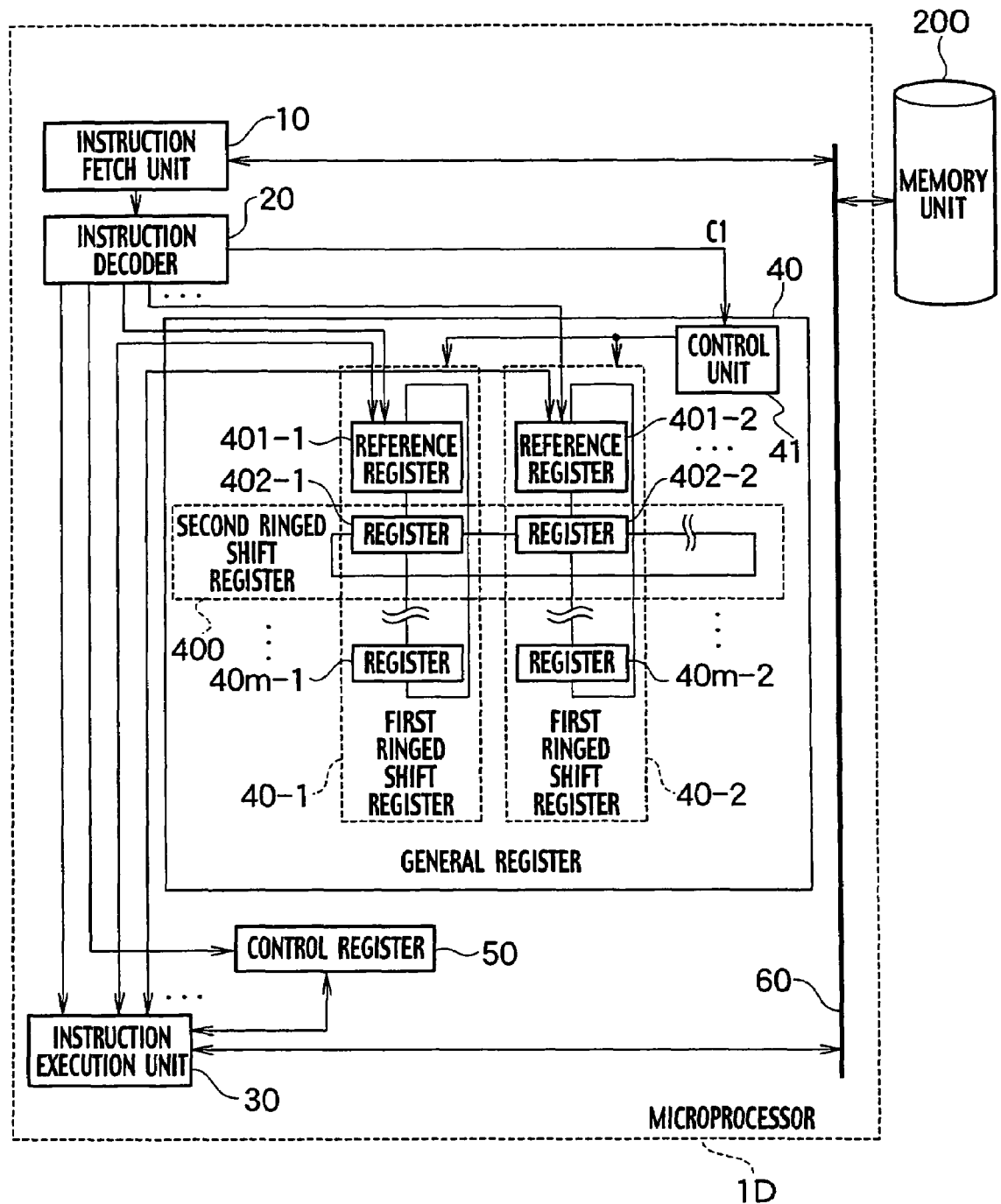
FIG. 4 is a view showing a schematic circuit configuration of a microprocessor according to a second embodiment of the present invention.

As shown in FIG. 4, a microprocessor 1D according to the second embodiment of the present invention is different from the microprocessor 1C shown in FIG. 3 in that a second ringed shift register 400 is additionally encompassed. The second ringed shift register 400 has a plurality of registers 402-1,

402-2, . . . , each being an element of the registers in each first ringed shift register 40-1, 40-2, . . . .

Hereafter, a structure of any one of the registers in the respective first ringed shift registers 40-1, 40-2, . . . being connected in a loop is referred to as a 'second ring'. On the other hand, a structure of the reference register 401-1 and the registers 402-1, . . . , and 40m-1 of the first ringed shift register 40-1 being connected in a loop is referred to as a 'first ring'.

FIG. 4 shows an example of the second ringed shift register 400 having the registers 402-1, 402-2, . . . ; alternatively, the second ringed shift register 400 may include an arbitrary one of the registers 402-1, . . . , and 40m-1 of the first ringed shift register 40-1, an arbitrary one of the registers 402-2, . . . , and 40m-2 of the first ringed shift register 40-2, . . . . When a control signal C1 is received from the instruction decoder 20, the second ringed shift register 400 performs a shift operation under the control of the control unit 41.

In the microprocessor 1D shown in FIG. 4, the second ringed shift register 400 performs a shift operation during program execution, and data transfer among the registers 402-1, 402-2, . . . included in the second ringed shift register 400 is executed. The rest is substantially the same as in the first embodiment; then, repetitive description thereof is omitted.

The microprocessor 1D encompassing the first ring and the second ring shown in FIG. 4 allows high-speed program execution such as circular buffer processing. Calculation of a recurrence formula given in Expression (1) is an example of a program including the circular buffer processing:

$$F(n)=a(1)F(n-1)+a(2)F(n-2)+\ldots+a(k)F(n-k) \quad (1)$$

where each of $a(1)$, $a(2)$, . . . , and $a(k)$ denotes an arbitrary coefficient (k and n denote an integer of 2 or greater, respectively).

Hereafter, an example of calculating using the recurrence formula shown in Expression (1) by the microprocessor 1D shown in FIG. 4 is described using FIGS. 5 through 8. FIGS. 5 through 8 show data stored in the first ringed shift registers 40-1, 40-2, . . . , and 40-n. However, when the stored data is arbitrary, it is shown as 'data'. In addition, the reference register 401-1 of the first ringed shift register 40-1, the reference register 401-2 of the first ringed shift register 40-2, . . . , and the reference register 401-n of the first ringed shift register 40-n are connected to the instruction decoder 20 and the instruction execution unit 30, respectively. Furthermore, the second ringed shift register 400 has the register 402-1 of the first ringed shift register 40-1, the register 402-2 of the first ringed shift register 40-2, . . . , and the register 402-n of the first ringed shift register 40-n.

Figure 5:
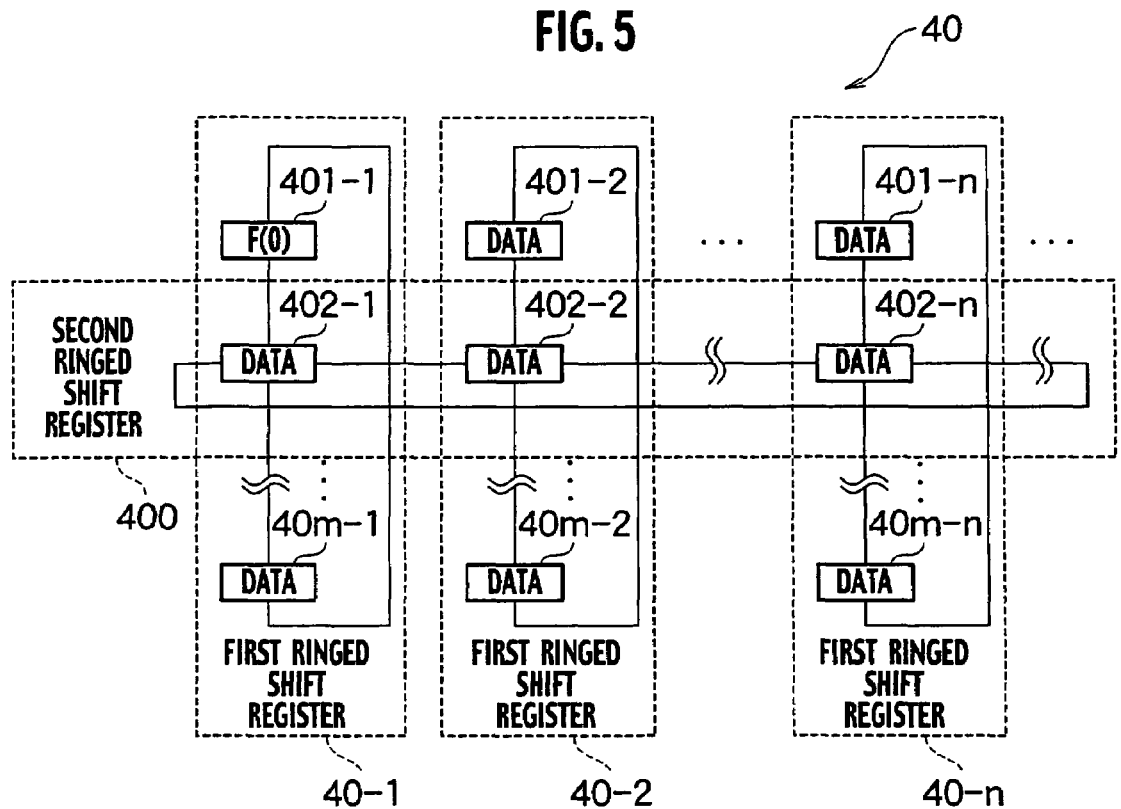
FIGS. 5, 6, 7, 8 are views showing data stored in registers to explain movements of the microprocessor according to the second embodiment of the present invention.

(a) To begin with, as shown in FIG. 5, data F(0) is stored in the reference register 401-1 of the first ringed shift register 40-1. The first ringed shift register 40-1 then performs a shift operation and stores data F(0) in the register 402-1.

Figure 6:
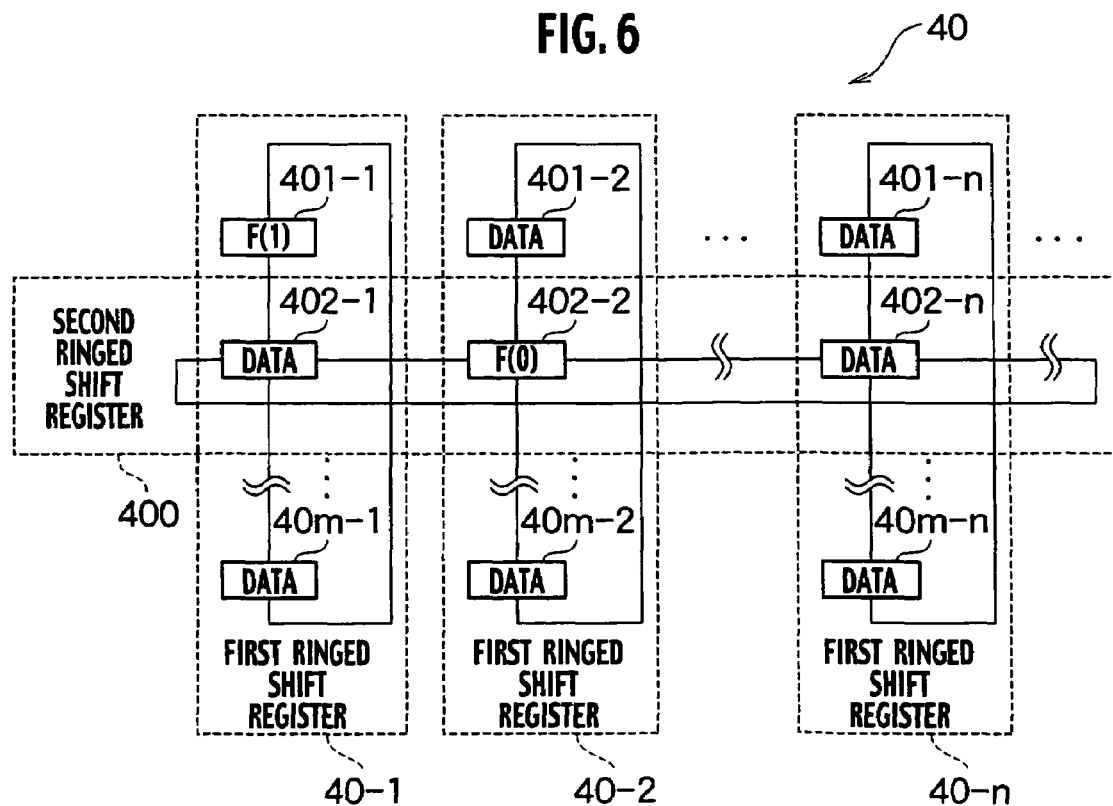

(b) Next, as shown in FIG. 6, the second ringed shift register 400 performs a shift operation and stores data F(0) in the register 402-2. In addition, data F(1) is stored in the reference register 401-1. The first ringed shift register 40-1 then performs a shift operation and stores data F(1) in the register 402-1. The second ringed shift register 400 then performs a shift operation and stores data F(0) in the register 402-3, and data F(1) in the register 402-2, respectively.

Figure 7:
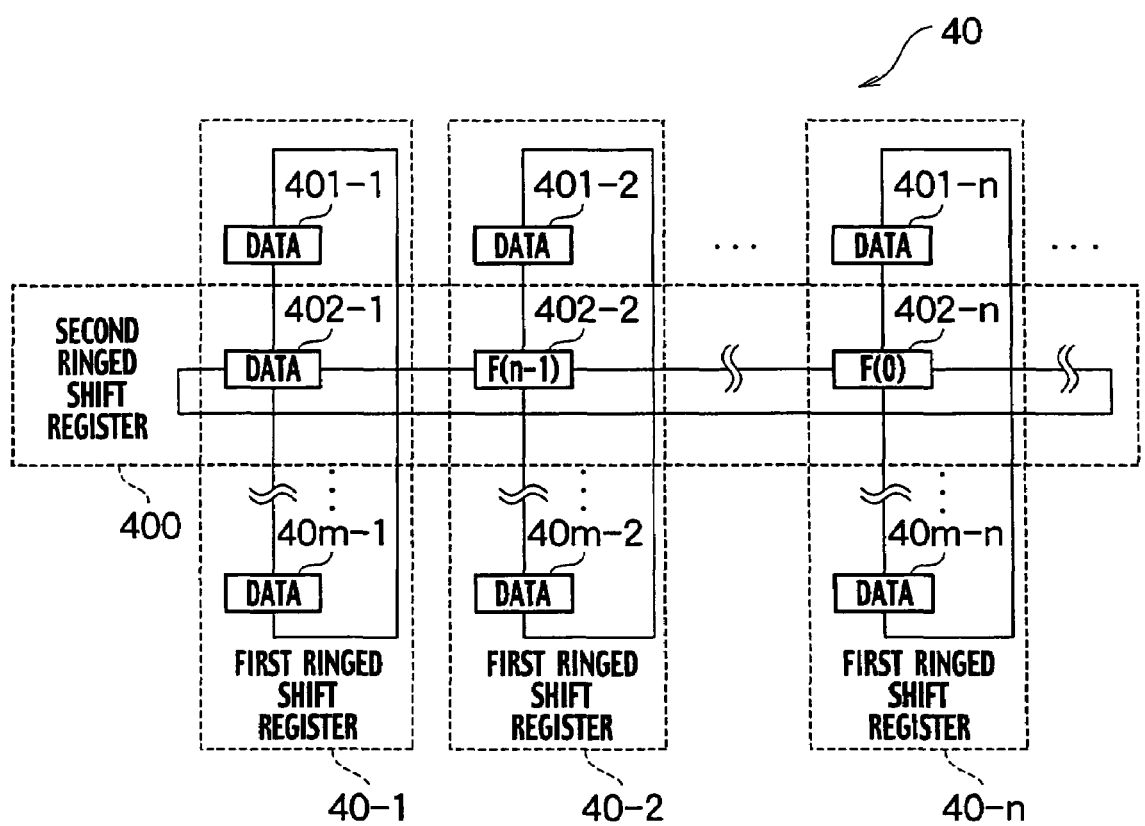

(c) As shown in FIG. 7, by repeating the above steps, data F(n-1), . . . , and F(0) are stored sequentially in the registers 402-2, . . . , and 402-n in the second ringed shift register 400.

Figure 8:
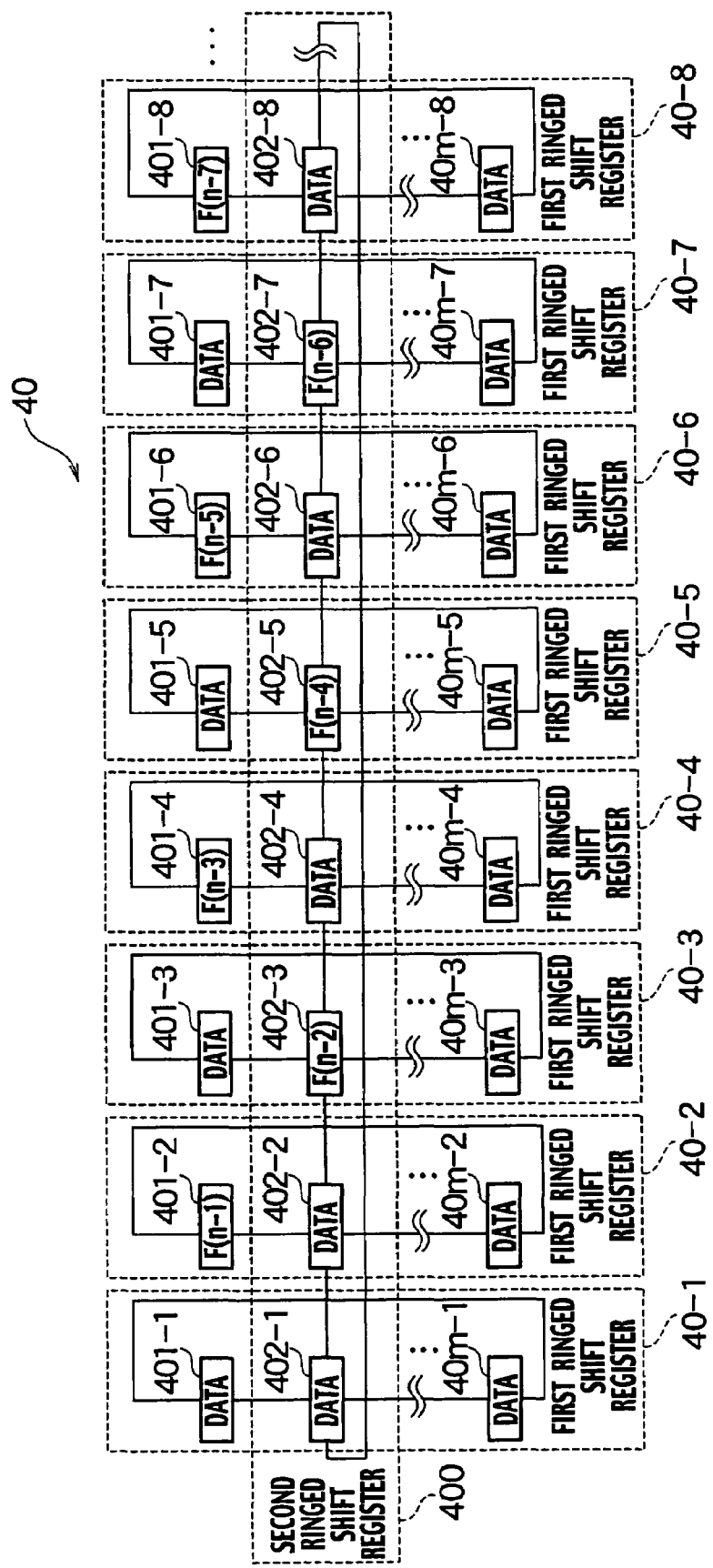

(d) In this case, assuming that an equation to be calculated using the recurrence formula in Expression (1) is, for example, Expression (2):

$$F(n)=F(n-1) \text{XOR } F(n-3) \text{XOR } F(n-5) \text{XOR } F(n-7) \quad (2)$$

where XOR denotes an exclusive-OR operator. Data F(n-1) is stored in the register 402-2 of the first ringed shift register 40-2; F(n-3) is stored in the register 402-4 of the first ringed shift register 40-4; F(n-5) is stored in the register 402-6 of the first ringed shift register 40-6; and F(n-7) is stored in the register 402-8 of the first ringed shift register 40-8, respectively. The first ringed shift registers 40-2, 40-4, 40-6, and 40-8 then perform a shift operation. As a result, as shown in FIG. 8, data F(n-1) is stored in the reference register 401-2 of the first ringed shift register 40-2; F(n-3) is stored in the reference register 401-4 of the first ringed shift register 40-4; F(n-5) is stored in the reference register 401-6 of the first ringed shift register 40-6; and F(n-7) is stored in the reference register 401-8 of the first ringed shift register 40-8, respectively.

(e) Next, the microprocessor 1D shown in FIG. 4 calculates Expression (2) using data F(n-1), F(n-3), F(n-5), and F(n-7).

With the above-described method, the general register 40 performs a shift operation and stores data required for executing a program including circular buffer processing. As a result, address calculation is unnecessary in circular buffer processing. Therefore, a program is executed at high speed, and Expression (2) can be calculated.

Third Embodiment

Figure 9:
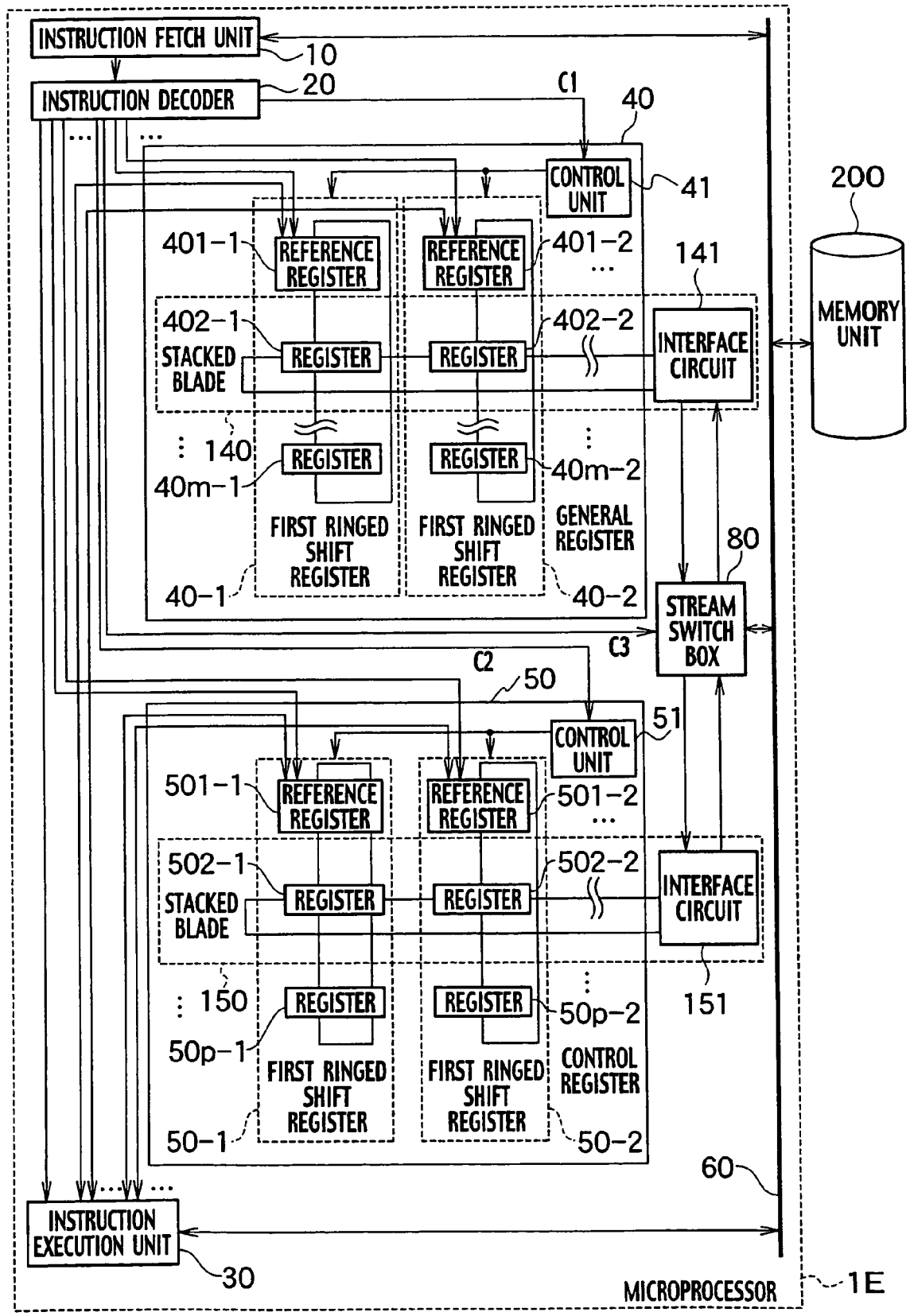
FIG. 9 is a view showing a schematic circuit configuration of a microprocessor according to a third embodiment of the present invention.

As shown in FIG. 9, a microprocessor 1E according to a third embodiment of the present invention encompasses the control register 50 including a plurality of first ringed shift registers 50-1, 50-2, . . . .

In the first ringed shift register 50-1, the reference register 501-1 and the registers 502-1, . . . , and 50p-1 are connected in a loop; where p denotes an integer of 2 or greater. The first ringed shift registers 50-2, . . . have the same structure as the first ringed shift register 50-1, respectively. In addition, the control register 50 includes a control unit 51. Furthermore, the reference registers 501-1, 501-2, . . . , each being one of the registers in the first ringed shift registers 50-1, 50-2, . . . , are connected to the instruction decoder 20 and the instruction execution unit 30. Moreover, the instruction decoder 20 is connected to the control unit 51. Furthermore, the control unit 51 is connected to the first ringed shift registers 50-1, 50-2, . . . , respectively. The first ringed shift registers 50-1, 50-2, . . . perform a shift operation, respectively, to replace data to be stored in the reference registers 501-1, 501-2, . . . , which exchange context information with the instruction decoder 20 and the instruction execution unit 30.

The microprocessor 1E includes a stacked blade 140, which has an additional interface circuit 141 and the registers 402-1, 402-2, . . . , which combine the second ring capable of shifting. The interface circuit 141 is connected to a stream switch box 80. A structure that allows connection of the second ring to the stream switch box 80 via the interface circuit 141 is referred to as a 'stacked blade'. The stacked blade 140 performs a shift operation under the control of the control unit 41. The control unit 41 is controlled by the control signal C1 from the instruction decoder 20.

The stream switch box 80 provides data received from a circuit connected to the stream switch box 80, to another circuit connected to the stream switch box 80 by the control signal C3 from the instruction decoder 20. As a result, data stored in the registers 402-1, 402-2, . . . of the stacked blade 140 is sent to the stream switch box 80, or data from the stream switch box 80 is stored in the registers 402-1, 402-2, . . . via the interface circuit 141. The interface circuit 141 exchanges data stored in the registers 402-1, 402-2, . . . of the stacked blade 140 with another circuit connected to the stream switch box 80. In other words, the stream switch box 80 may control data transfer among the registers 402-1, 402-2, . . . of the stacked blade 140 and another circuit connected to the stream switch box 80.

FIG. 9 shows an exemplary configuration of the stacked blade 140 with the registers 401-1, 402-2, . . . ; alternatively, the stacked blade 140 may be composed of arbitrary registers of the respective first ringed shift registers 40-1, 40-2, . . . .

In addition, the microprocessor 1E includes a stacked blade 150, which has an interface circuit 151 and the registers 502-1, 502-2, . . . , each being an element of the registers in each first ringed shift register 50-1, 50-2, . . . . The interface circuit 151 is connected to the stream switch box 80. The first ringed shift registers 50-1, 50-2, . . . and the stacked blade 150 perform a shift operation under the control of the control unit 51. The control unit 51 is controlled by a control signal C2 from the instruction decoder 20. Data transfer among the registers 502-1, 502-2, . . . of the stacked blade 150 and another circuit connected to the stream switch box 80 is possible via the interface circuit 151. FIG. 9 shows an exemplary configuration of the stacked blade 150 with the registers 502-1, 502-2, . . . ; alternatively, the stacked blade 150 may be composed of arbitrary registers in the respective first ringed shift registers 50-1, 50-2, . . . .

Figure 10:
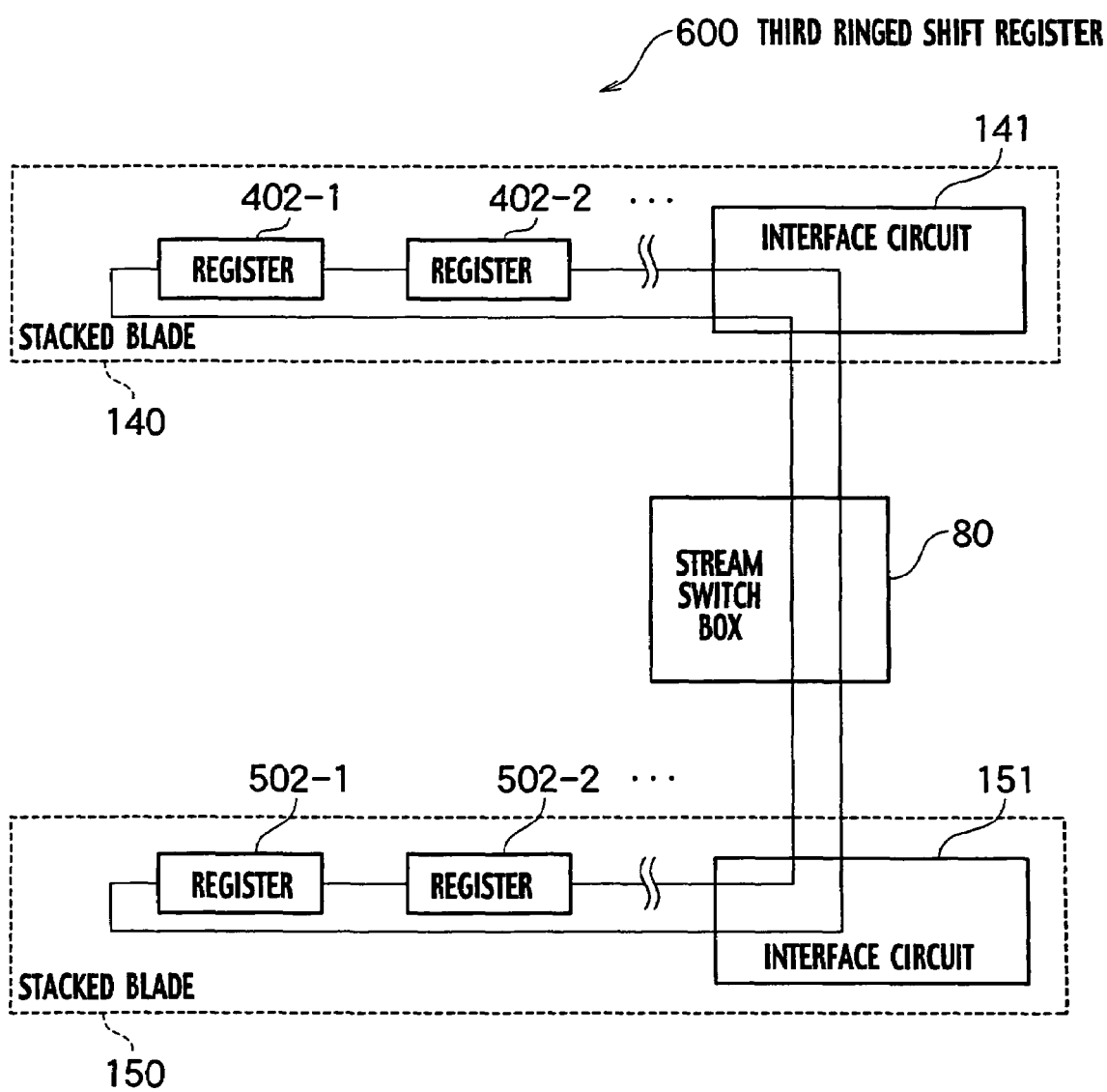
FIG. 10 is a view showing a schematic circuit configuration of a third ring of the microprocessor according to the third embodiment of the present invention.

Alternatively, the microprocessor 1E may combine a single ringed structure through the connection between the stacked blade 140 and the stacked blade 150 via the stream switch box 80. In other words, as shown in FIG. 10, a third ringed shift register 600 in which the registers 402-1, 402-2, . . . and the registers 502-1, 502-2, . . . are connected in a loop via the interface circuit 141, the stream switch box 80, and the interface circuit 151 may be formed. Hereafter, a ringed structure of plural stacked blades being connected as shown in FIG. 10 is referred to as a 'third ring'.

When the third ringed shift register 600 as shown in FIG. 10 is formed in the microprocessor 1E shown in FIG. 9, the number of registers capable of storing context information may substantially increase in comparison with the microprocessor 1D shown in FIG. 4. The third ringed shift register 600 performs a shift operation under the control of the control units 41 and 51.

On the other hand, in the microprocessor 1E including the third ring, the number of registers for storing context information increases. Therefore, typically, the number of times the microprocessor 1E performs a shift operation for reading the context information used for the microprocessor 1E to execute a program increases. In the case of giving preference to the operating speed over the number of sets of context information, it is possible to control the microprocessor 1E to operate without forming the third ring. The stream switch box 80 may control stacked blades 140 and 150 either to combine the third ring or be used as the second ring according to the control signal C3 from the instruction decoder 20.

In addition, employment of a ringed structure of the control register 50 allows further reduction in power consumption of the microprocessor 1E. The rest is substantially the same as those in the first and the second embodiment; then, repetitive description thereof is omitted.

FIG. 9 shows an example of implementation of two stacked blades 140 and 150 in the microprocessor 1E; alternatively, stacked blades may further be included. The stream switch box 80 may select arbitrary stacked blades to combine the third ring according to the control signal from the instruction decoder 20. In addition, FIG. 9 shows an example of the stream switch box 80 being connected to the internal bus 60; alternatively, a structure of the stream switch box 80 not being connected to the internal bus 60 is possible.

<Modification of the Third Embodiment>

Figure 11:
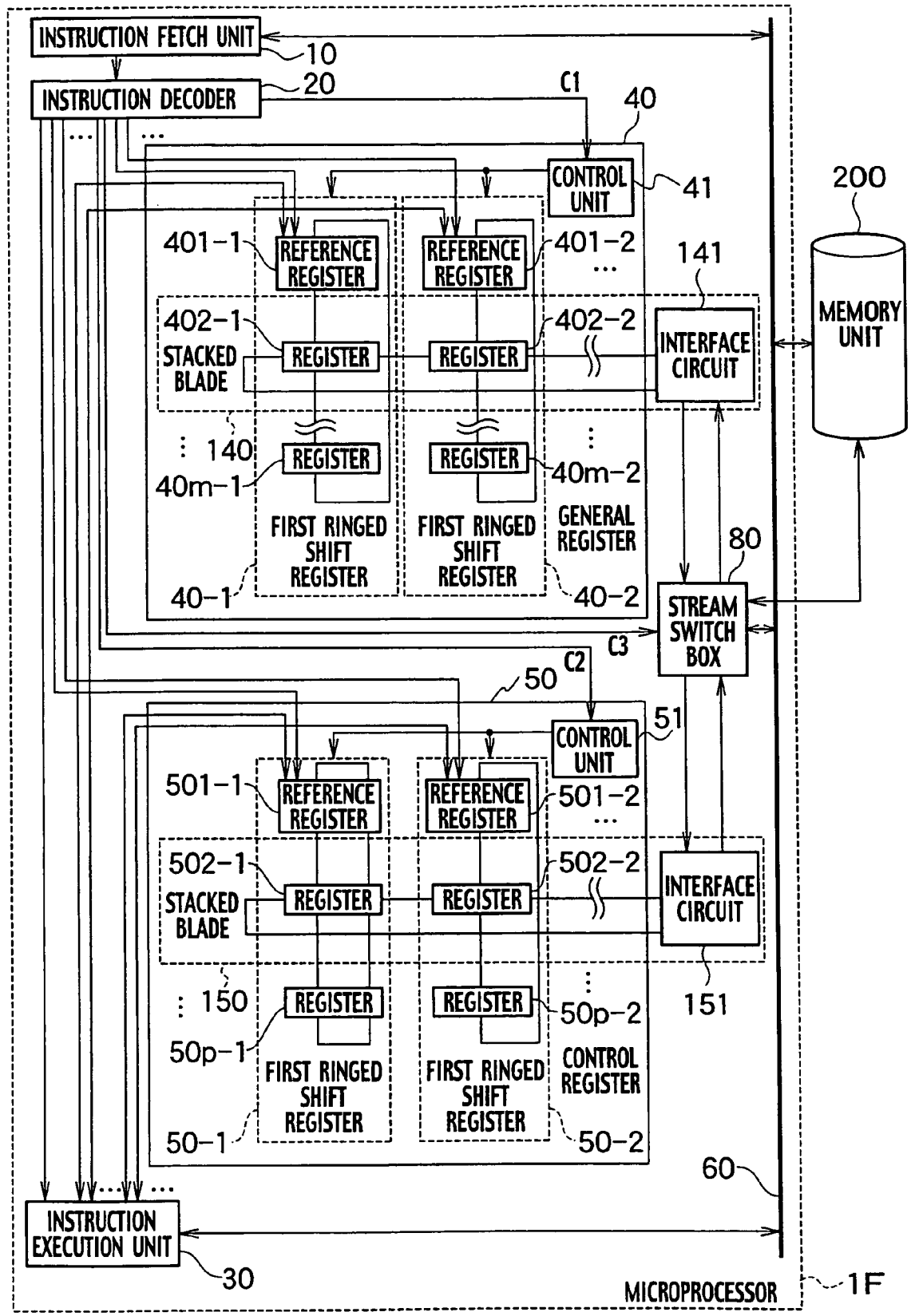
FIG. 11 is a view showing a schematic circuit configuration of a microprocessor according to a modification of the third embodiment of the present invention.

FIG. 11 shows a microprocessor according to a modification of the third embodiment of the present invention. The microprocessor 1F shown in FIG. 11 is different from the microprocessor 1E shown in FIG. 9 in that a memory unit 200 connects to the stream switch box 80. Other configurations are the same as those of the microprocessor 1E shown in FIG. 9.

The microprocessor 1F shown in FIG. 11 allows data transfer among the memory unit 200 and the stacked blades 140 and 150 via the stream switch box 80. For example, data stored in the general register 40 may be written into the memory unit 200, or data stored in the memory unit 200 may be read in the general register 40 during program execution by the microprocessor 1F.

OTHER EMBODIMENTS

According to the above description of the third embodiment, the single microprocessor 1E is connected to the stream switch box 80; alternatively, data transfer among plural microprocessors is possible by connecting respective stacked blades in the plural microprocessors arranged on the same chip to the stream switch box 80.

Various modifications will become possible for those skilled in the art after receiving the teachings of the present disclosure without departing from the scope thereof.

What is claimed is:

1. A microprocessor comprising:
    a first ringed shift register including a plurality of registers configured to store a plurality of context information respectively, the registers being connected in a loop;
    an instruction decoder configured to transmit the context information to a reference register in the first ringed shift register;
    an instruction execution unit configured to exchange the context information with the reference register, the context information being shifted to the reference register from one of registers in the first ringed shift register other than the reference register by performing a shift operation; and
    a control unit configured to control the first ringed bit shift register to perform a shift left or right operation to carry out context switching.

2. The microprocessor of claim 1, wherein the instruction decoder provides instructions configured to control the first ringed shift register to perform the shift operation.

3. The microprocessor of claim 1, further comprising a control timer configured to control the context switching.

4. The microprocessor of claim 3, wherein the instruction decoder provides instructions configured to control the control timer.

5. The microprocessor of claim 1, further comprising a second ringed shift register including a plurality of registers connected in a loop.

6. The microprocessor of claim 5, wherein the instruction decoder provides instructions configured to control the second ringed shift register to perform a shift operation.

7. The microprocessor of claim 5, wherein the second ringed shift register and an interface circuit for exchanging data with another circuit implement a stacked blade.

8. The microprocessor of claim 7, further comprising a stream switch box connected to the interface circuit and configured to be connected to a memory unit.

9. The microprocessor of claim 8, wherein the instruction decoder provides instructions configured to control data transfer between the memory unit and the interface circuit connected to the stream switch box.

10. The microprocessor of claim 8, wherein a plurality of the stacked blades implement a third ringed shift register, the stacked blades being connected via the stream switch box.

11. The microprocessor of claim 10, wherein the instruction decoder provides instructions configured to combine the third ringed shift register.

12. The microprocessor of claim 10, wherein the instruction decoder provides instructions configured to control the third ringed shift register to perform a shift operation.

* * * * *